United States Patent
Togami

[15] 3,669,461
[45] June 13, 1972

[54] PISTON RING
[72] Inventor: Shunji Togami, Zushi, Japan
[73] Assignee: Nippon Piston Ring Co., Ltd., Tokyo, Japan
[22] Filed: May 19, 1970
[21] Appl. No.: 38,825

[30] Foreign Application Priority Data

May 20, 1969 Japan....................................44/45818

[52] U.S. Cl. ..........................................227/235 R, 277/224
[51] Int. Cl............................................................F16j 9/00
[58] Field of Search..............117/105, 105.2; 277/237, 235, 277/235 A, 224, 223; 29/156.6

[56] References Cited

UNITED STATES PATENTS 2,956,848  10/1960  St. Clair................................277/224

FOREIGN PATENTS OR APPLICATIONS 584,903  10/1959  Canada..................................277/223
471,517  5/1936  Great Britain........................277/237

Primary Examiner—Robert I. Smith
Attorney—Sughrue, Rothwell, Mion, Zinn & Macpeak

[57] ABSTRACT

A cast iron piston ring which has an annular groove cut at the outer periphery and a stainless steel insert sprayed into the annular groove.

2 Claims, 1 Drawing Figure

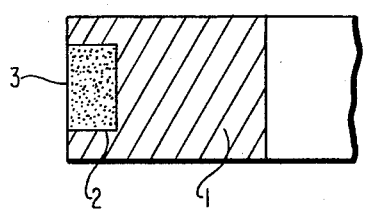

PISTON RING

BACKGROUND OF THE INVENTION

This invention relates to a piston ring of an internal combustion engine, and more particularly to a method for manufacturing a piston ring more cheaply.

The modern marine diesel engine has been designed for high performance while using low cost fuel oil. For this reason, piston rings for marine engines must have improved corrosion resistance and wear resistance. This invention contemplates providing a piston ring adapted for such usage.

SUMMARY OF THE INVENTION

It is, therefore, an object of the present invention to provide a piston ring which has superior corrosion resistance and wear resistance.

It is another object of the invention to provide a piston ring which has a superior "running-in" property.

It is a further object of the invention to provide a piston ring which has large resistance against a scuffing.

It is still another object of this invention to provide a piston ring which may be manufactured less expensively.

The other objects, features and advantages of the present invention will become apparent from the following description taken in conjunction with the accompanying drawing, in which:

The FIGURE is a partial sectional view of a piston ring formed according to this invention.

Referring to the drawing, the piston ring of this invention comprises a cast iron piston ring body 1, an annular groove 2 cut on an outer peripheral surface of the piston ring body 1, and a stainless steel layer 3 which is sprayed into the annular groove 2. The piston ring so constructed has the following properties:

1. Since the sprayed stainless steel layer of the piston ring has corrosion resistance and wear resistance superior to cast iron, it is adapted for marine engines of large and intermediate types using a low cost fuel oil.
2. Since the stainless steel layer being formed by spraying is porous, it holds lubricant oil and thus has better wear resistance, running-in property, and scuffing resistance, than non-porous cast iron.
3. In comparison with the conventional piston rings which are manufactured with sprayed molybdenum layers which are very expensive to manufacture due to the expense of molybdenum, the sprayed stainless steel layer may be manufactured less expensively while still retaining high performance similar to that of a sprayed molybdenum piston ring.

EXAMPLE

The measurements of wearing amounts of the piston ring formed according to the present invention to the conventional piston ring having a sprayed molybdenum layer, and to a cast iron piston ring which is not sprayed are as follows:

Type of engine: marine two cycle, nine cylinder diesel engine;
Inner diameter × stroke: 900 mm × 1550 mm;
Continuous Power: 20,700 PS/119 rpm;
Experiment conditions:
   Engine speed: 112 rpm;
   Operating time: 5,100 hours;
Fuel: Heavy low cost fuel oil
Dimensions of piston ring:
   Cylinder diameter × Axial breadth × Radial thickness:
     (900 mm × 17.9 mm × 27 mm)
Shape of sprayed stainless steel welding layer:

| | |
|---|---|
| Axial breadth of sprayed stainless steel: | 13.9 mm |
| Radial thickness of sprayed stainless steel: | 1.5 mm |

Composition of stainless steel:

| Ni | C | Mn | Si | P | S | Cr | Mo | Fe |
|---|---|---|---|---|---|---|---|---|
| ----- | 0.32 | 0.50 | 0.50 | 0.02 | 0.02 | 13.5 | ----- | Balance. |

Test results:
Maximum wearing amount per 1,000 hrs.

| | |
|---|---|
| This invention: | 0.27 mm. |
| Molybdenum ring: | 0.13 mm. |
| Cast iron ring: | 0.96 mm. |

As a result of our experimentation, we have found that the radial thickness of sprayed stainless steel is preferably kept in the range of 0.2 – 2.0 mm.

Example of some other compositions of stainless steel material adapted for this invention are as follows:

| Ni | C | Mn | Si | P | S | Cr | Mo | Fe (percent) |
|---|---|---|---|---|---|---|---|---|
| 8–10 | 0.08 | 2 | 0.75 | 0.03 | 0.03 | 18–20 | ----- | Balance. |
| 10–14 | 0.08 | 2 | 1 | 0.04 | 0.03 | 16–18 | 2–3 | Do. |
| 4–6 | 0.15 | 8.50 | 1 | 0.06 | 0.03 | 17–19 | ----- | Do. |

What is claimed is:

1. A piston ring comprising an annular cast iron body, an annular groove on the outer periphery of said cast iron body and a sprayed stainless steel insert within said peripheral groove and completely coextensive therewith, said stainless steel insert having substantially the following composition, 0.32 percent carbon, 0.50 percent manganese, 0.50 percent silicon, 0.02 percent phosphorous, 0.02 percent sulfur, 13.5 percent chromium and the balance iron.

2. A piston ring as claimed in claim 1, wherein the radial thickness of the sprayed stainless steel is in the range of 0.2–2.0 mm.

* * * * *